United States Patent Office 2,982,744
Patented May 2, 1961

2,982,744

PLASTICS MOLDING MATERIALS AND PROCESSES

Jan Lodewijk Voigt, Arnhem, Netherlands, assignor to N.V. Onderzoekingsinstituut Research, Arnhem, Netherlands, a corporation of the Netherlands No Drawing. Filed May 25, 1959, Ser. No. 815,334
Claims priority, application Netherlands June 12, 1958

6 Claims. (Cl. 260—18)

This invention relates to the production of plastics molding materials by associating a particular lubricant with a high molecular weight synthetic linear polyamide prepared from ε-caprolactam or ε-aminocaproic acid, as well as to molded objects manufactured from the resulting composition.

The particular lubricant thus associated with the plastics molding material serves to facilitate the removal from the mold of the molded objects on injection molding of a synthetic linear polyamide prepared from ε-caprolactam or ε-aminocaproic acid. It is especially effective in preventing the sticking of the molded objects to the mold. In extruding these polyamides in softened condition the lubricant facilitates the release of the extruded object from the nozzle.

It has previously been proposed to mix a polyamide, prepared from ε-caprolactam or ε-aminocaproic acid, with a higher fatty acid or a higher alcohol as a lubricant. Stearic acid, stearyl alcohol and cetyl alcohol have thus been proposed as a lubricant for polyamides. In practice, however, it has been found that the foregoing lubricants are not always satisfactory in their action of facilitating the removal of the molded objects from the mold. When the mold is maintained at temperatures above about 40° C. and below about 60° C. on injection molding the above-mentioned polyamides, it is true that the step of removal is facilitated by said lubricants but the sticking of the molded objects to the mold is nevertheless not fully prevented. As a result the molded objects are deformed by removal from the mold.

It has now been discovered, in accordance with the present invention, that the sticking of the molded objects to the mold on injection molding the above-mentioned polyamides, prepared from ε-caprolactam or ε-aminocaproic acid, is fully prevented at any temperature of the mold by using a particular fatty acid as a lubricant.

According to the present invention, the synthetic linear polyamide, prepared from ε-caprolactam or ε-aminocaproic acid, is admixed with behenic acid as a lubricant.

It has been found that relatively small proportions of the behenic acid, such as 0.05% based on the weight of the aforesaid polyamides, inhibit the sticking of objects in the mold. Preferably, however, 0.1 to 4.0% by weight of the behenic acid is used.

The addition of the behenic acid as lubricant to the aforesaid polyamides may be carried out in various ways. Thus, the behenic acid lubricant may, for example, be mixed with granules of these polyamides before the injection molding or the extrusion thereof, or it may be mixed with the molten polyamide material.

It is to be particularly noted that the addition of the behenic acid has no appreciable influence on other properties of these polyamides and consequently it is especially well adapted for use as lubricant in accordance with the present invention.

In order to indicate still more fully the nature of the present invention the following example of typical procedure is set forth, it being understood however that this description is presented by way of illustration only and not as limiting the scope of the invention.

EXAMPLE

Granules of a polyamide, prepared from ε-caprolactam in a manner well known per se, were mixed with 0.25, 1.0 and 2% by weight of behenic acid, respectively. From the resulting granules of polyamide plus lubricant, combs having 60 teeth were then formed with the aid of an automatic injection mold machine of otherwise conventional design and operation.

The temperature of the mold was maintained at 30°, 35°, 40°, 45°, 50°, 55°, 60°, 65°, 75° and 90° C., respectively, during the series of runs.

In addition, and for purposes of comparison, granules of the same polyamide were mixed with corresponding proportions of stearic acid, stearyl alcohol and cetyl alcohol, and the resulting molding compositions were then formed into combs having 60 teeth with the same injection molding machine and in otherwise the same manner. The temperature of the mold was likewise varied as hereinabove described during these latter comparison runs.

In the following table the results of the runs with the various lubricants as described above are given. From this table it clearly appears that by mixing the granules of polyamide with behenic acid the number of bent teeth in the combs formed at mold temperatures between 40° and 60° C. was reduced to zero, the bending of the teeth in the other runs being caused by the sticking of the combs to the mold.

Table

LUBRICANT IN PERCENT BY WEIGHT

| Temp. Mold, °C. | Stearic acid | | | Stearyl alcohol | | | Cetyl alcohol | | | Behenic acid | | |
|---|---|---|---|---|---|---|---|---|---|---|---|---|
| | 0.25 | 1.0 | 2.0 | 0.25 | 1.0 | 2.0 | 0.25 | 1.0 | 2.0 | 0.25 | 1.0 | 2.0 |
| | Average number of bent teeth per comb | | | | | | | | | | | |
| 30 | 0 | 0 | 0 | 0 | 0 | 0 | 0 | 0 | 0 | 0 | 0 | 0 |
| 35 | 0 | 0 | 0 | 0 | 0 | 0 | 0 | 0 | 0 | 0 | 0 | 0 |
| 40 | 0 | 0 | 0 | 0 | 0 | 0 | 0 | 0 | 0 | 0 | 0 | 0 |
| 45 | 7 | 5 | 6 | 10 | 6 | 6 | 10 | 6 | 7 | 0 | 0 | 0 |
| 50 | 9 | 7 | 6 | 12 | 6 | 7 | 10 | 7 | 7 | 0 | 0 | 0 |
| 55 | 7 | 4 | 4 | 12 | 6 | 6 | 11 | 7 | 7 | 0 | 0 | 0 |
| 60 | 0 | 0 | 0 | 0 | 0 | 0 | 0 | 0 | 0 | 0 | 0 | 0 |
| 65 | 0 | 0 | 0 | 0 | 0 | 0 | 0 | 0 | 0 | 0 | 0 | 0 |
| 75 | 0 | 0 | 0 | 0 | 0 | 0 | 0 | 0 | 0 | 0 | 0 | 0 |
| 90 | 0 | 0 | 0 | 0 | 0 | 0 | 0 | 0 | 0 | 0 | 0 | 0 |

While a specific example of a preferred method and composition embodying the present invention has been described above, it will be apparent that many changes and modifications may be made in the details of the methods of procedure and in the compositions without departing from the spirit of the invention. It will therefore be understood that the example cited and the particular methods of procedure and the compositions set forth above are intended to be illustrative only, and are not intended to limit the scope of the invention.

What is claimed is:

1. A method for producing a plastics molding material comprising mixing a synthetic linear polyamide, prepared from a monomer selected from the class consisting of ε-caprolactam and ε-aminocaproic acid, with behenic acid as a lubricant.

2. A method as defined in claim 1 wherein 0.1 to 4.0% of behenic acid, based on the weight of the said polyamide, is used.

3. A plastics molding material comprising a synthetic linear polyamide, prepared from a monomer selected from the class consisting of ε-caprolactam and ε-aminocaproic acid, in admixture with behenic acid as a lubricant.

4. A composition as defined in claim 3 wherein the behenic acid is present in the amount of 0.1 to 4.0% based on the weight of said polyamide.

5. A method for manufacturing molded objects, characterized in that a plastics molding material prepared according to the method defined in claim 1 is used as the starting material.

6. Molded objects manufactured according to the method defined in claim 5.

References Cited in the file of this patent

FOREIGN PATENTS 634,172    Great Britain  ---------- Mar. 15, 1950